US006340881B1

(12) United States Patent
Meyer

(10) Patent No.: US 6,340,881 B1
(45) Date of Patent: Jan. 22, 2002

(54) ELECTRIC APPARATUS WITH SUPPLY VOLTAGE CONTROL, OPERATING IN ALTERNATING OR DIRECT CURRENT

(75) Inventor: Olivier Meyer, Baron sur Odon (FR)

(73) Assignee: Crouzet Automatismes, Valence (FR)

( * ) Notice: Subject to any disclaimer, the term of this patent is extended or adjusted under 35 U.S.C. 154(b) by 0 days.

(21) Appl. No.: 09/786,350

(22) PCT Filed: Sep. 10, 1999

(86) PCT No.: PCT/FR99/02162

§ 371 Date: Mar. 13, 2001

§ 102(e) Date: Mar. 13, 2001

(87) PCT Pub. No.: WO00/16174

PCT Pub. Date: Mar. 23, 2000

(30) Foreign Application Priority Data

Sep. 15, 1998 (FR) ............................................. 98 11500

(51) Int. Cl.[7] .................................................. G05F 1/40
(52) U.S. Cl. ...................................................... 323/282
(58) Field of Search .............................. 323/265, 267, 323/282, 283, 349, 351

(56) References Cited

U.S. PATENT DOCUMENTS 5,581,173 A * 12/1996 Yalla et al. .................. 323/257
5,907,233 A * 5/1999 Jabaji .......................... 323/283
6,191,568 B1 * 2/2001 Poletti ......................... 323/268

FOREIGN PATENT DOCUMENTS

EP 0 336 051 10/1989
EP 0 784 329 7/1997

* cited by examiner

Primary Examiner—Adolf Deneke Berhane
(74) Attorney, Agent, or Firm—Oblon, Spivak, McClelland, Maier & Neustadt, P.C.

(57) ABSTRACT

The invention relates to an electrical apparatus, such as a timer, permanently supplied from the mains between two terminals A and B and the operation of which can be triggered by taking a control input E to the potential of the terminal B via an external contact SW. In order to take account of the possibility of a pilot lamp or another load being present between the terminals E and A, the following circuit structure is proposed: a low-voltage power-supply circuit AL, operating in half-wave rectification mode, supplies a voltage Vdd to a microcontroller MC. The terminal at Vdd is linked to the terminal B and the voltage regulation Vdd is carried out on another conductor at a potential regarded as a zero-volt reference. The control input E of the apparatus is linked to a detection input DT of the microcontroller. The microcontroller polls this input in order to detect whether the contact SW is open or closed: if it is open, the input DT sees a zero or AC voltage at the period of the 50 Hz or 60 Hz mains; if it is closed, the input DT sees a voltage close to Vdd, and the microcontroller, for example, triggers the timing by the timer. The apparatus also operates if the permanent power supply between A and B is DC.

2 Claims, 3 Drawing Sheets

ELECTRIC APPARATUS WITH SUPPLY VOLTAGE CONTROL, OPERATING IN ALTERNATING OR DIRECT CURRENT

The invention relates to an electrical apparatus with electronic control, permanently supplied with AC or DC, and an operating mode of which can be triggered by the application of the supply voltage to a control input of the apparatus.

A typical example of apparatus covered by the invention is a timer which is normally continuously supplied with power, and which closes or opens a relay for a defined duration after the closure of an electrical control contact which applies the supply voltage (the mains at 230 volts, for example) onto the control input of the timer. Or else a timer which closes or opens a relay after a defined duration has elapsed after the closure of this control contact.

However, the invention may be applied to much other electrical apparatus, wherever a functionality of this apparatus is triggered by the application, to a control input, of a voltage which is the voltage permanently supplying the apparatus.

Figure 1:
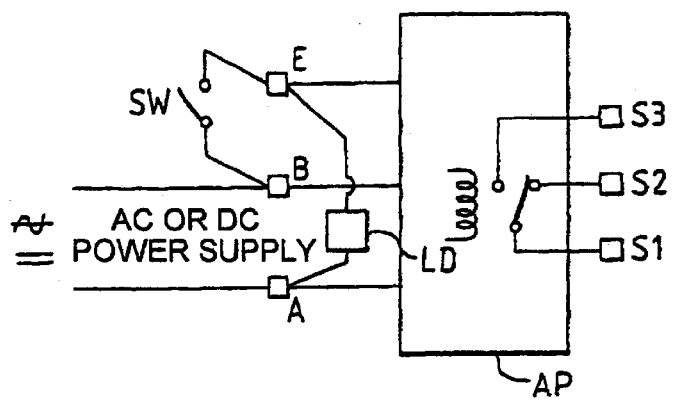

FIG. 1 represents the general principle of the apparatus which it is desired to produce, and it will be considered, in what follows, that it is a timer that is involved.

The apparatus AP includes two permanent external power-supply terminals A and B intended to receive an AC voltage (mains voltage at 230 volts, for example) or a DC voltage (for example 12 volts or 24 volts).

The apparatus also includes a control input E and, if the functionality of the apparatus requires it, output terminals, here S1, S2, S3. In this example, S1, S2, S3 are the output terminals of a relay internal to the apparatus.

The control input E triggers the operation of the apparatus if it is taken to the potential of the power-supply terminal B, for example by the closing of a contact SW linked between E and B. This contact SW may be a mechanical or electronic switch. A load LD has been represented, moreover, in FIG. 1, placed in parallel between the terminal A and the control input E, this load therefore consuming a current whenever the input E ceases to be at the potential of A, for example if the input E is taken to the potential of B. To give an idea, the load LD may quite simply be a pilot lamp which shows that the timer has been triggered.

This load linked to the control input E complicates the design of the internal control circuits of the apparatus as a result of the leakage currents which flow in this load when the contact SW is open. One object of the invention is to propose a control circuit which functions even in the event that this load is present.

Another object of the invention is to propose a control circuit which functions for various values of power-supply voltage of the apparatus, that is to say which can be connected directly to the power-supply voltage whatever the level thereof within a wide range of values.

Figure 2:
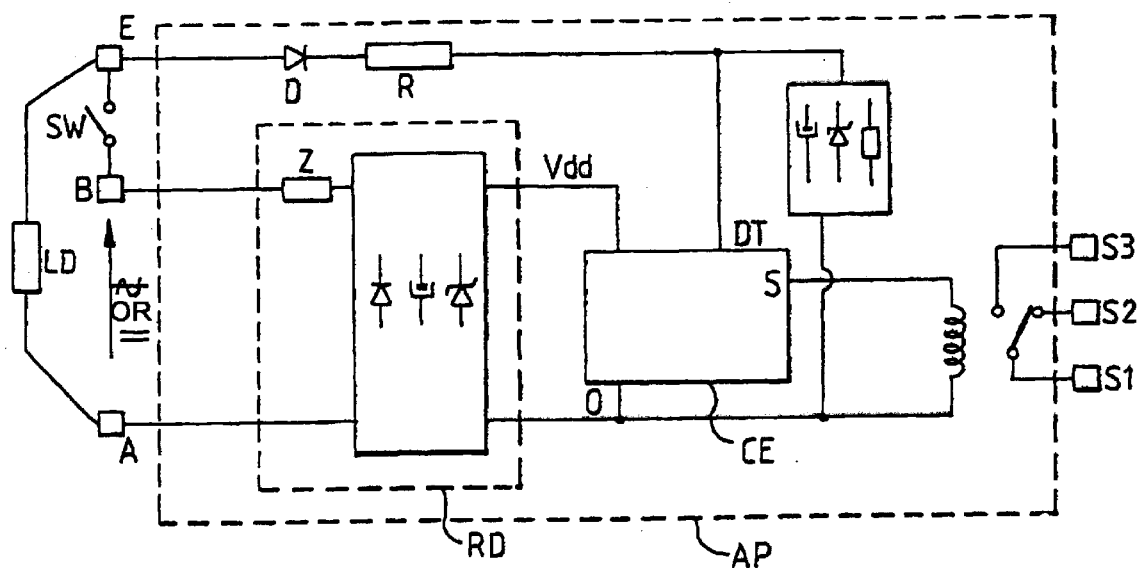

In the prior art, apparatus such as that of FIG. 2 has been proposed, in which the apparatus contains an internal electronic circuit CE providing the desired functionality (control of the timing duration and control of the output relay, for example) and operating at low DC voltage Vdd (5 volts, for example). The internal electronic circuit then includes a detection input DT and the observation of the voltage level on this input DT allows the triggering of the desired operation of the apparatus. The voltage Vdd is derived from a rectification, filtering and regulation circuit RD. The control input E of the apparatus is linked to the detection input DT via a rectifier diode D and a resistor R. A voltage-level regulation and filtering circuit can be placed in parallel between the detection input DT and the 0 reference potential of the power supply Vdd. When the external contact SW is closed, the detection input DT receives a detectable signal which triggers the timer.

This solution has the drawback of being usable only for apparatus operating with a single possible power-supply voltage (for example 230 volts AC), since the value of the resistor R has to be matched to each power-supply voltage.

The voltage level on the detection input DT, after the contact SW has been closed, has in fact to be defined precisely in order for the circuit to function correctly.

Moreover, this solution also exhibits the drawback of a coupling between the external power supply and the detection input DT via the load LD when the contact SW is open, and this coupling is undesirable.

Figure 3:
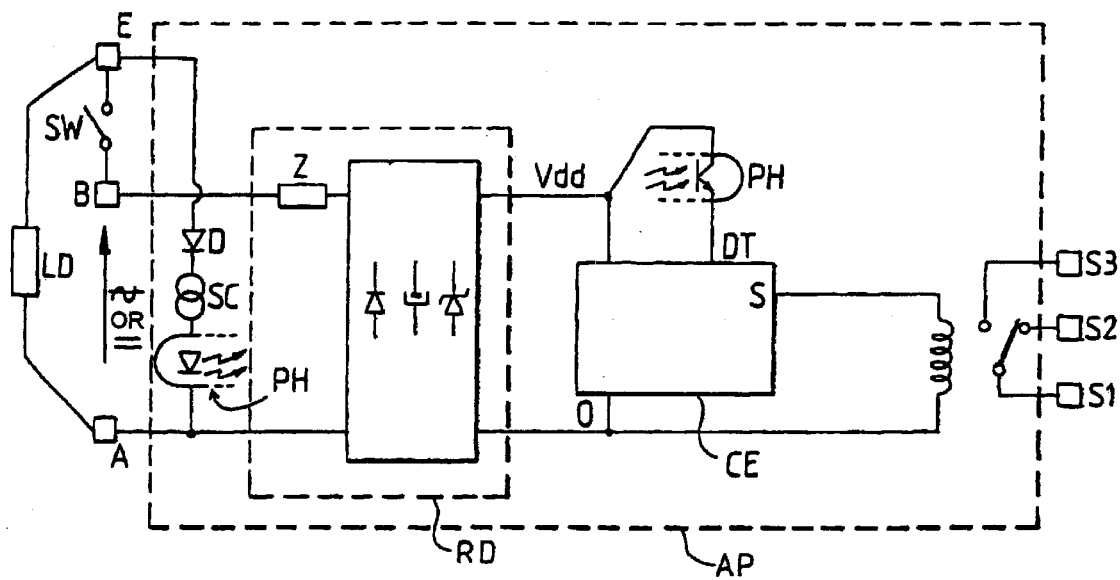

Apparatus has also been proposed, such as that of FIG. 3, using a photocoupler in order to provide DC isolation between the control input E and the detection input DT. The control input E is linked to a series assembly of a rectifier diode D, a current limiter SC and the input of a photocoupler PH. This series assembly is linked, furthermore, to the power-supply terminal A, and the photocoupler is activated when the control input E is taken to the potential of the terminal B via the contact SW. The output of the photocoupler PH is linked in series between the power-supply voltage Vdd of the internal electronic circuit CE, on the one hand, and the detection input DT, on the other hand. The rectification, filtering and regulation circuit RD, which produces the voltage Vdd, is identical to that of FIG. 2. A filtering circuit can also be placed in parallel between the detection input DT and the reference potential at 0 volts.

This circuit of FIG. 3 can function with a power-supply voltage having several possible levels (at least if the rectification, filtering and regulation circuit RD allows it). However, it is expensive because of the photocoupler and its current limiter.

The present invention proposes a different construction, not using a photocoupler, based on the use of half-wave rectification to produce the low-voltage DC Vdd, of a resistive divider bridge to apply this low voltage to the detection input DT, and digital processing making it possible to deduce the position of the contact SW from the shape of the signal present on the detection input DT, even in the case where an external load LD is connected to this contact.

According to the invention, on the one hand, the low voltage Vdd produced in order to supply the internal electronic circuits is established on the conductor linked to one of the power-supply external terminals (the one which is additionally linked to the contact SW); on the other hand, the resistive divider bridge, the intermediate point of which is linked to the detection input DT, is placed in series between the control input of the apparatus and the 0-volt reference potential of the low-voltage Vdd DC power supply. Thus, when the contact SW is closed, the potential Vdd is reinjected onto the detection input DT via the divider bridge. Conversely, when the contact SW is open, the resistive divider bridge is no longer supplied, but remains linked to the 0-volt reference potential in order to keep the detection input DT at zero.

In summary, the present invention proposes an electrical apparatus having two external power-supply terminals and including an electrical circuit accomplishing a defined function under the control of the closing or opening of an electrical contact capable of being linked between a first one of the external power-supply terminals and a control input, the apparatus further including:

an electronic decision circuit supplied by two conductors, one of which is at reference potential and the other of which is at a low DC voltage Vdd, the decision circuit having a signal-detection input and an output which is capable of taking up two states depending on the nature of the signal present on the detection input, this output controlling the said defined function of the electrical circuit, a low-voltage DC power-supply circuit, itself supplied via the two external power-supply terminals, this circuit carrying out half-wave rectification and having the conductors at the reference potential and at the voltage Vdd as its outputs, the apparatus being characterized in that:
a) the conductor at the voltage Vdd is linked to an external power-supply terminal,
b) the control input of the apparatus is linked by a first resistor R1 to the detection input of the decision circuit,
c) the detection input is linked by a second resistor R2 to the conductor at the reference potential,
d) the decision circuit includes electronic means for, on the one hand, detecting the presence on the detection input of an alternating signal or of the reference potential, and then for putting the output into a first state, and, on the other hand, detecting the presence, on the detection input, of a DC potential other than the reference potential, and then for putting the output into a second state.

The decision circuit will preferably consist of a microcontroller which can accomplish other functions in the apparatus and which, for the requirements of the invention, includes a program for testing the voltage level present on the detection input, and for comparing this voltage with a predetermined threshold, the program including a periodic test and causing the output to change to the second state if n successive tests show that the voltage level exceeds the predetermined threshold, n being a number chosen as a function of the period of the tests and of the period of the AC mains likely to supply the apparatus (50 Hz and/or 60 Hz especially).

Figure 4:
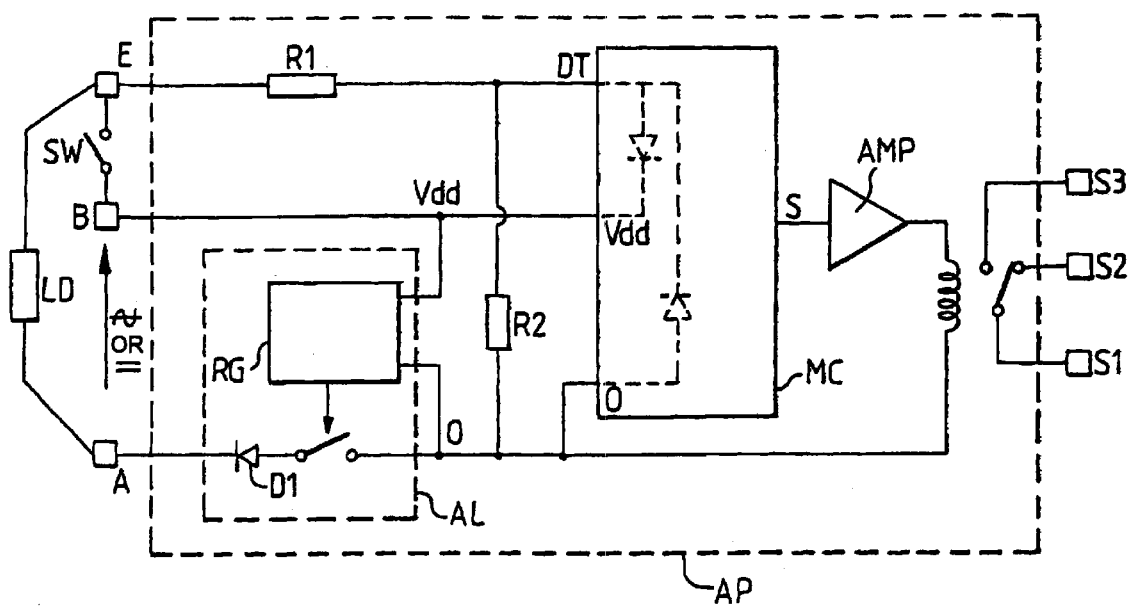
Figure 5:

Other characteristics and advantages of the invention will emerge on reading the detailed description which follows and which is given by reference to the attached drawings, in which:

FIGS. 1 to 3, already described, represent electrical apparatus according to the prior art, FIG. 4 represents the composition of electrical apparatus according to the invention, FIG. 5 represents a table of the various voltage-level configurations which are possible on the detection input DT.

Thus the apparatus according to the invention, represented in FIG. 4, includes two external power-supply terminals A and B, a control input E, and outputs depending on the functionality of the apparatus, here three outputs S1, S2, S3, for example.

The apparatus may be a timer, the outputs of which are linked together by a switch such that, in a rest state, the output S1 is linked to the output S2 and that, in an activated state, the output S1 is linked to the output S3; when the timer receives a voltage on its control input E equal to the power-supply voltage present on the terminal B, it triggers the throwing of the switch from the rest state to the activated state; then, at the end of a period of time determined by an internal electronic circuit, the timer puts the switch back into the rest state. This example of apparatus and of operating mode is not limiting.

The electronic circuit which controls the operation of the apparatus preferably consists, in essence, of a microcontroller MC, that is to say a microprocessor provided with a working memory and with a program memory. This microcontroller is powered by a low DC voltage of a few volts, by the use of two conductors one of which will be regarded as being at a zero reference potential and the other at a potential Vdd. It will be assumed, in what follows, that Vdd is the positive potential of the DC power supply of the microcontroller.

The microcontroller MC possesses inputs and outputs, and especially an input DT which will be called detection input because one of the functions of the microcontroller will be that of polling the voltage on this input DT in order to perform actions (of timing, in the case of a timer) for certain signal configurations present on this input. Furthermore, the microcontroller especially possesses an output S linked to the input of an amplifier AMP; the output of the amplifier drives the coil of the relay which causes the switch linked to the terminals S1, S2, S3 to change over. The amplifier is unnecessary if the microcontroller supplies sufficient power on the output S.

The electrical apparatus of FIG. 4 further includes a low-voltage DC power-supply circuit AL, which receives its power from the external power-supply terminals A and B and which supplies a reference potential at zero and a potential at Vdd on the two conductors which supply the microcontroller MC with power.

The power-supply circuit AL is a rectification, filtering and regulation circuit, but it should be stressed that the rectification is half-wave rectification, which has been shown symbolically in FIG. 4 by a single diode D1 in series with the conductor which brings in the current from the external power-supply terminal A to the power-supply circuit AL.

The power-supply terminal B is linked directly to the conductor at the potential Vdd; the voltage regulation which produces a voltage Vdd of 5 volts from the power-supply voltage between A and B then acts on the conductor at the reference potential and not on the conductor at Vdd. With this regulation being generally carried out by a switching-mode circuit, the switch has been represented in FIG. 4 in series between the terminal A and the conductor at the reference potential. This switch is controlled by a voltage-regulation circuit RG.

It will be noted that, for reasons of symmetry, t is also possible to envisage the switching being applied to the other conductor, on condition that a few adaptations of layout are made, for example on condition that the timer is designed to detect the closing of a contact between the terminals E and A rather than E and B, and on condition that the resistive divider, which is going to be discussed now, is connected to the conductor at Vdd and not to the reference potential.

The control terminal E of the apparatus is linked by a resistor R1 to the detection input DT of the internal electronic circuit CE, here the input DT of the microcontroller. A resistor R2 is provided between the detection input DT and the power-supply conductor at the 0-volt reference potential. This latter resistor may form an integral part of the input electronics circuit; for example, it may form an integral part of the integrated circuit constituting the microcontroller. If the microcontroller does not possess such an integrated resistor between the input DT and the reference conductor, one will have to be placed outside the microcontroller.

Finally, the correct operation of the electronic circuit requires that the detection input DT be protected against the application of excessively high positive voltages or of negative voltages; protection diodes are provided between this input and the two power-supply conductors at Vdd and zero. As these protection diodes are, in any event, provided in nearly all integrated circuits, it will not be necessary, in general, to make provision to add them.

The operation of the apparatus is as follows:

it is supplied continuously with a power-supply voltage applied between the terminals A and B. This voltage is an AC or DC voltage and its level may be fixed (apparatus operating on a single-voltage power supply) or have several possible values (multi-voltage power supply): this depends on the structure of the power-supply circuit AL which supplies the low voltage Vdd. The simplest power-supply circuits support only a single value of external power-supply voltage, but more sophisticated circuits, and especially circuits operating in switched mode, may establish a voltage Vdd at their output although they are supplied with a voltage which may take several levels, either DC (for example 12 and 24 volts) or AC (for example any AC voltage between 20 volts and 264 volts). The invention is particularly beneficial in the case in which this type of multi-voltage power-supply circuit is used.

With the electrical apparatus, timer or otherwise, being powered continuously, it is not having voltage supplied by the terminals A and B which triggers its operation, or its change into a particular operating mode. However, this operation is triggered by voltage being applied to the control input E, and, more precisely, in the case of the layout represented in FIG. 4 (terminal B linked to Vdd), it is the fact of taking the control input E to the potential of the terminal B which triggers the operation or the mode of operation desired.

A load LD may be connected by the user between the terminals E and A of the apparatus, for example a pilot light which lights up when the contact SW is closed.

Two operating cases of the apparatus have to be distinguished, depending on whether a load LD is present or absent. In both cases, the apparatus has to detect the closing of the contact SW and then to trigger a defined operation (triggering of the timer).

A—No Load LD Between the Terminals A and E

1)—Contact SW Open

The potential of the detection input DT is pulled down to zero potential by the resistor R2. The resistor R1 is floating.

2)—Contact SW Closed

The potential Vdd is applied to the end of the resistor R1. The potential of the detection input DT takes a value Vdd.R2/(R1+R2) defined by the divider bridge R1, R2.

The division ratio R2/(R1+R2) has to be chosen in such a way that the detection input sees a higher logic level when the contact SW is closed, the level being low when the contact is open.

It is thus easy to detect the closing of the contact SW by observing the voltage on the detection input DT. The signal on the input DT is identical, whether the apparatus is working on AC or DC.

B. Load LD Present Between the Terminals A and E

1)—Contact SW Open a) General Power Supply at DC:

The rectification performed by the power-supply circuit AL is of half-wave type and it is then necessary to observe the polarity of the voltage to be applied between the terminals A and B: positive potential on terminal B, negative on terminal A.

The load LD receives a negative potential (the general power-supply voltage value being assumed to be higher than vdd, and the terminal B being at the potential Vdd). The detection input DT is pulled down by the load LD and the resistor R1 to a negative potential, but in fact remains at zero because of one of the protection diodes internal to the microcontroller. The logic level on the input DT is a low level.

b) General Power Supply at AC

The load LD and the resistor R1 pull the input DT alternately towards a negative voltage (positive voltage half-waves on terminal B) and towards a positive potential (negative voltage half-waves). The protection diodes of the microcontroller clip, to about zero volt and about Vdd respectively, the voltage variations thus generated on the input DT by the AC power-supply voltage the voltage presents on this input is a succession of pulses clipped at 0 and Vdd respectively.

The input DT therefore sees an alternating series of high and low logic levels at the frequency of the power-supply mains (50 Hz or 60 Hz, in general).

2) Contact SW Closed

The fixed potential Vdd is applied to the resistor R1 and the potential of the input DT is, this time again, taken to a value Vdd.R2/(R1+R2) defined by the divider bridge. This value has to be sufficient to correspond to a high logic level.

FIG. 5 reiterates these various cases in a summary table.

In short, in order for the microcontroller to detect the state of the contact SW and trigger the desired operation independently of the fact that a load LD is present or absent, it must be able to distinguish the following two states of the input:

state 1: the potential of the input is at a low logic level or else it alternates periodically between a low logic level and a high logic level; in these two cases, the microcontroller recognizes an open contact SW and draws conclusions from that as to triggering of the functionality of the apparatus;

state 2: the potential of the input is at a high logic level and it remains stable at this level; in this case, the microcontroller recognizes a closed contact SW and draws another conclusion from that as to the triggering of the functionality of the apparatus.

The microcontroller therefore has to continually poll the voltage level on the detection input DT and determine whether this input is in state 1 or state 2.

It will be noted that the discrimination which has to be carried out does not depend on the external power-supply voltage level, nor on the fact that this power supply is AC or DC, and it is for that reason that the invention is particularly beneficial in the case of multi-voltage apparatus.

This determination of the state of the input DT can be carried out by programming the microcontroller appropriately, knowing that the AC voltage possibly present in state 1 has a known period, which is that of the mains (50 Hz or 60 Hz); it is therefore possible to ask the microcontroller to determine whether the voltage is at the low logic level at least once every half-period, and to ask it to deduce therefrom whether the switch SW is closed; or to verify that the logic level remains high from one half-period to the next, and to deduce therefrom that the contact SW is closed.

The preferred way of determining the state of the detection input DT will depend on the operation of the microcontroller. If it operates, for example, with a timebase of about 4 milliseconds (the case of a low-cost microcontroller), the microcontroller can be programmed so that it successively registers the voltage levels every 4 milliseconds and that it keeps in memory, at every instant, the level of the last four logic values detected. If the four values are high, that means that the contact has been closed; otherwise it is open. It is possible, needless to say, to provide for the electrical apparatus to be triggered only after a further series of four measurements confirming the succession of four high logic levels.

This number of four successive measurements taken every 4 milliseconds allows detection for a mains frequency of 50 Hz as well as for frequency of 60 Hz. This is because four measurements separated by 4 milliseconds extend over 12 milliseconds and therefore correspond to two or three measurements in one of the half-cycles and at least one measurement in the next half-cycle of the mains, the duration of a positive or negative half-cycle being 10 milliseconds in the case of 50 Hz mains and 8.33 milliseconds in the case of 60 Hz.

It would be possible, obviously, to follow the same reasoning for other values of timebase of the microcontroller and to determine the number of successive levels which have to be verified in order to arrive at the desired determination, it being understood that the timebase period need not be equal to the period of the mains nor a multiple of that period.

The choice of the resistors R1 and R2 should be made while taking account of the fact that it is generally desirable to limit the leakage current in the load LD when the contact SW is open. Resistors of several hundreds of kilohms could be used. The ratio R2/(R1+R2) should be sufficiently high for the voltage value Vd.R2/(R1+R2) to correspond to a high logic level.

Furthermore, the resistor R1 alone has to withstand almost the whole of the voltage of the mains when the contact SW is open, and this fact should be taken into account when sizing it.

What is claimed is:

1. Electrical apparatus having two external power-supply terminals (A, B) and including an electrical circuit accomplishing a defined function under the control of the closing or opening of an electrical contact (SW) capable of being linked between a first one of the external power-supply terminals (B) and a control input (E) of the apparatus, the apparatus further including:

an electronic decision circuit (CE, MC) supplied by two conductors, one of which is at reference potential and the other of which is at a low DC voltage Vdd, the decision circuit having a signal-detection input (DT) and an output (S) which is capable of taking up two states depending on the nature of the signal present on the detection input, this output controlling the said defined function of the electrical circuit, a low-voltage DC power-supply circuit (AL), itself supplied via the two external power-supply terminals (A, B), this circuit carrying out half-wave rectification and having the conductors at the reference potential and at the voltage Vdd as its outputs, the apparatus being characterized in that:
 a) the conductor at the voltage Vdd is linked to an external power-supply terminal (B),
 b) the control input (E) of the apparatus is linked by a first resistor (R1) to the detection input (DT) of the decision circuit,
 c) the detection input is linked by a second resistor (R2) to the conductor at the reference potential,
 d) the decision circuit includes electronic means for,
 on the one hand, detecting the presence on the detection input of an alternating signal or of the reference potential, and then for putting the output (S) into a first state,
 and, on the other hand, detecting the presence, on the detection input, of a DC potential other than the reference potential, and then for putting the output (S) into a second state.

2. Electrical apparatus according to claim 1, characterized in that the decision circuit consists of a microcontroller (MC) including a program for testing the voltage level present on the detection input (DT), and for comparing this voltage with a predetermined threshold, the program including a periodic test and causing the output to change to the second state if n successive tests show that the voltage level exceeds the predetermined threshold, n being a number chosen as a function of the period of the tests and of the period of the mains alternating currents likely to supply the apparatus (50 Hz and/or 60 Hz especially).

* * * * *